United States Patent
Eppler et al.

(10) Patent No.: US 8,057,164 B2
(45) Date of Patent: Nov. 15, 2011

(54) CONTINUOUS-FLOW MACHINE, TURBINE, OR COMPRESSOR

(75) Inventors: Volker Eppler, Waldshut-Tiengen (DE); Tanguy Arzel, Ennetbaden (CH); Martin Schnieder, Ennetbaden (CH)

(73) Assignee: ALSTOM Technology Ltd., Baden (CH)

( * ) Notice: Subject to any disclaimer, the term of this patent is extended or adjusted under 35 U.S.C. 154(b) by 370 days.

(21) Appl. No.: 12/429,249

(22) Filed: Apr. 24, 2009

(65) Prior Publication Data

US 2009/0285676 A1 Nov. 19, 2009

(30) Foreign Application Priority Data

May 15, 2008 (CH) ........................................ 738/08

(51) Int. Cl.
- *F01D 5/14* (2006.01)
- *F03D 11/00* (2006.01)
- *F04D 29/38* (2006.01)

(52) U.S. Cl. .................... 415/115; 415/173.6; 60/39.02; 60/772

(58) Field of Classification Search .................. 415/115, 415/116, 117, 121.2, 173.6; 60/772, 39.02

See application file for complete search history.

(56) References Cited

U.S. PATENT DOCUMENTS

| | | | | |
|---|---|---|---|---|
| 5,983,623 A | * | 11/1999 | Aoki et al. | .................. 60/806 |
| 6,308,511 B1 | * | 10/2001 | Beeck et al. | .................. 60/772 |
| 7,052,233 B2 | * | 5/2006 | Fried et al. | ............... 415/121.2 |
| 7,128,530 B2 | * | 10/2006 | Anguisola McFeat et al. | ... 416/2 |

FOREIGN PATENT DOCUMENTS

| | | |
|---|---|---|
| EP | 0972910 | 1/2000 |
| GB | 2443117 | 4/2008 |

OTHER PUBLICATIONS

Search Report for Swiss Patent App. No. 00738/08 (Oct. 13, 2008).

* cited by examiner

*Primary Examiner* — David Nhu
(74) *Attorney, Agent, or Firm* — Cermak Nakajima LLP; Adam J. Cermak

(57) ABSTRACT

A continuous-flow machine (1), in particular a turbine or a compressor, includes at least one stator blade section (2) which has a plurality of stator blades (3) which project into a gas path (10) of a working gas, and at least one adjacent section (6), which has a plurality of adjacent elements (7), which bound the working gas path (10) at the side. A gap (11), through which a cooling gas can be introduced into the working gas path (10), is formed between the stator blades (3) of the stator blade section (2) and the adjacent elements (7) of the adjacent section (6). In order to improve the efficiency of the continuous-flow machine (1), lateral seals (14) are formed in the gap (11) and prevent or at least impede pressure equalization and/or a gas flow in the gap (11) in the lateral direction (5).

14 Claims, 4 Drawing Sheets

CONTINUOUS-FLOW MACHINE, TURBINE, OR COMPRESSOR

This application claims priority under 35 U.S.C. §119 to Swiss patent application no. 00738/08, filed 15 May 2009, the entirety of which is incorporated by reference herein.

BACKGROUND

1. Field of Endeavor

The present invention relates to a continuous-flow machine, in particular a turbine or a compressor.

2. Brief Description of the Related Art

A continuous-flow machine normally has at least one stator blade section which has a plurality of stator blades which are arranged alongside one another in a lateral direction running transversely with respect to the main flow direction of a working gas and project into a gas path of the working gas. Furthermore, an adjacent section can be adjacent to the rotor blade section, upstream or downstream in the main flow direction, and has a plurality of adjacent elements which are arranged alongside one another in the lateral direction and bound the working gas path at the side. A gap can be formed in the main flow direction between stator blades of the stator blade section and the adjacent elements of the adjacent section, which gap extends in the lateral direction and through which a cooling gas can be introduced into the working gas path.

In this case, the cooling gas is introduced into the gap in order to prevent or at least reduce any ingress of the hot working gas into the gap. The cooling gas must accordingly be introduced into the gap at a pressure which is at equal magnitude to or is greater than the pressure in the working gas path.

The pressure in the working gas path is subject to certain fluctuations. In particular, it is possible to observe that stagnation-point pressure waves can occur on leading edges of the stator blades during operation of the continuous-flow machine and propagate in the opposite direction to the main flow direction. Furthermore, wake pressure waves can form on trailing edges of the stator blades and propagate in the main flow direction. Where the stagnation-point pressure waves or the wake pressure waves strike the gap, increased pressures occur in the working gas. In order nevertheless to make it possible to prevent or reduce any ingress of working gas into the gap, the pressure of the cooling gas in the gap is increased accordingly. A relatively large amount of cooling gas is therefore necessary overall in order to reduce or to prevent any ingress of hot working gas into the respective gap. The greater the amount of cooling gas that enters the working gas path, the lower is the efficiency of the continuous-flow machine. There is therefore a need to reduce the amount of cooling gas required.

SUMMARY

One of numerous aspects of the present invention deals with the aforementioned problem with continuous-flow machines, including that it has a reduced requirement for cooling gas and, accordingly, may have a higher efficiency.

Another aspect of the present invention relates to the general idea of providing lateral seals in the gap, which seals are designed such that they prevent, or at least impede or reduce, pressure equalization and a gas flow in the gap in the lateral direction, that is to say in the longitudinal direction of the gap. This design means that propagation of the pressures within the gap in the lateral direction is impeded or prevented in those areas in which the stagnation-point pressure wave or the wake pressure wave strikes the gap, thus making it possible to improve the flow of the cooling gas in the gap, and therefore the cooling effect. Any disturbing interaction of the pressure fluctuations with areas, which are adjacent in the lateral direction, within the gap can be significantly reduced. In particular, less cooling gas is required in order to achieve adequate cooling, thus improving the efficiency of the continuous-flow machine.

In one particularly advantageous embodiment, the lateral seals are arranged along the gap such that first gap sections, in which a stagnation-point pressure wave of the respective stator blade or a wake pressure wave of the respective stator blade strikes the gap, are separated from second gap sections, which are adjacent thereto. This decouples the first gap sections, with pressure fluctuations induced therein by the pressure waves, from the second gap sections, thus making it possible to considerably reduce the influence of said pressure waves there.

In one particularly advantageous development, the cooling gas is introduced into the gap with a higher pressure in the first gap sections than in the second gap sections. This embodiment makes use of the knowledge that the cooling gas pressure in the second gap sections can be reduced considerably, in order to make it possible to ensure adequate cooling and adequate protection against any hot working gas entering, than is necessary for the first gap sections. This makes it possible to considerably reduce the amount of cooling gas required, by the reduced pressure in the second gap sections, this increasing the efficiency of the continuous-flow machine.

Further important features and advantages of continuous-flow machines according to principles of the present invention will become evident from the drawings and from the associated description of the figures on the basis of the drawings.

BRIEF DESCRIPTION OF THE DRAWINGS

Preferred exemplary embodiments of the invention are illustrated in the drawings and will be explained in more detail in the following description, wherein the same reference signs relate to identical, similar, or functionally identical components. In the figures, in each case schematically.

DETAILED DESCRIPTION OF EXEMPLARY EMBODIMENTS

Figure 1:
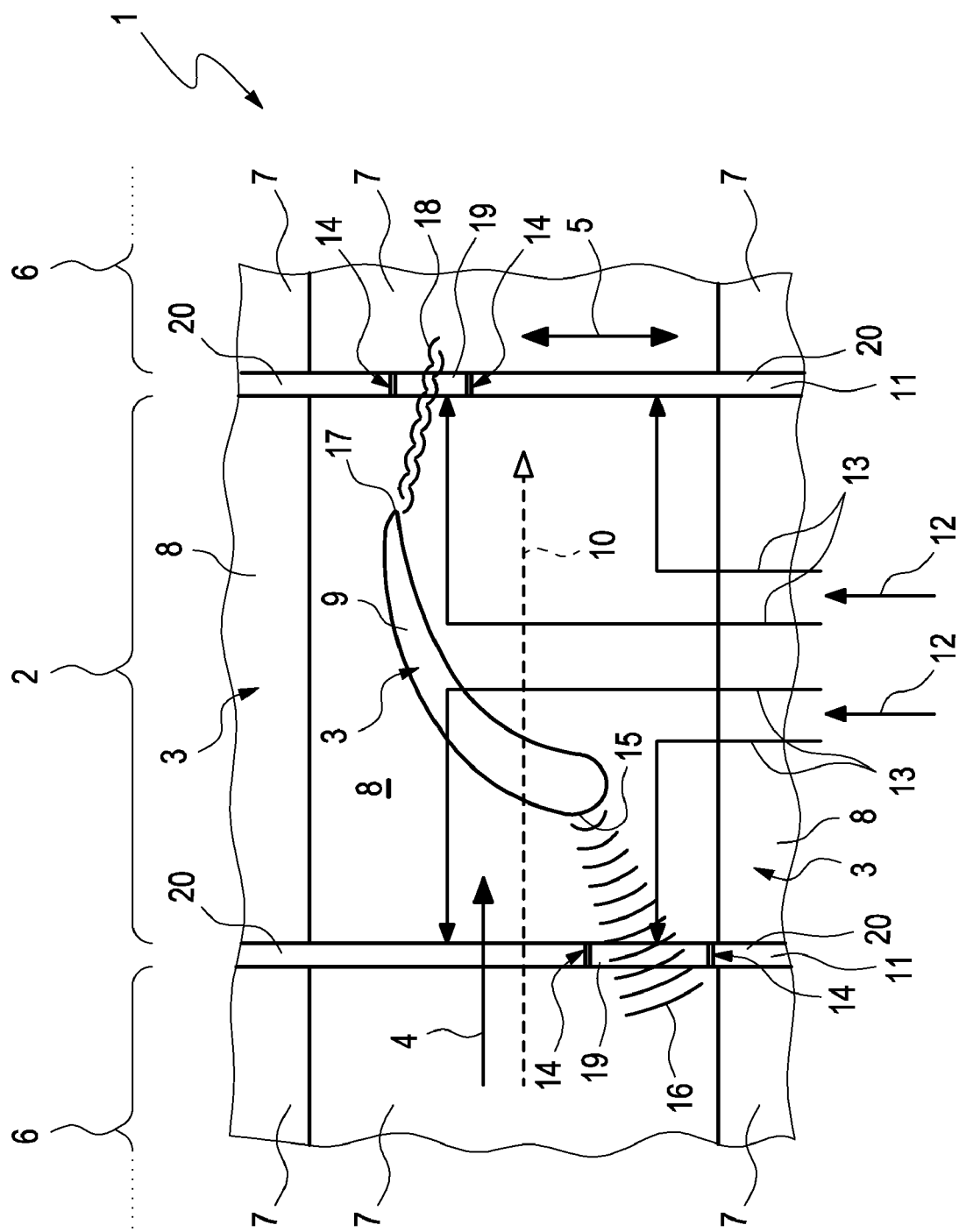
FIG. 1 shows a highly simplified outline plan view of a continuous-flow machine in the area of a stator blade.
Figure 4:
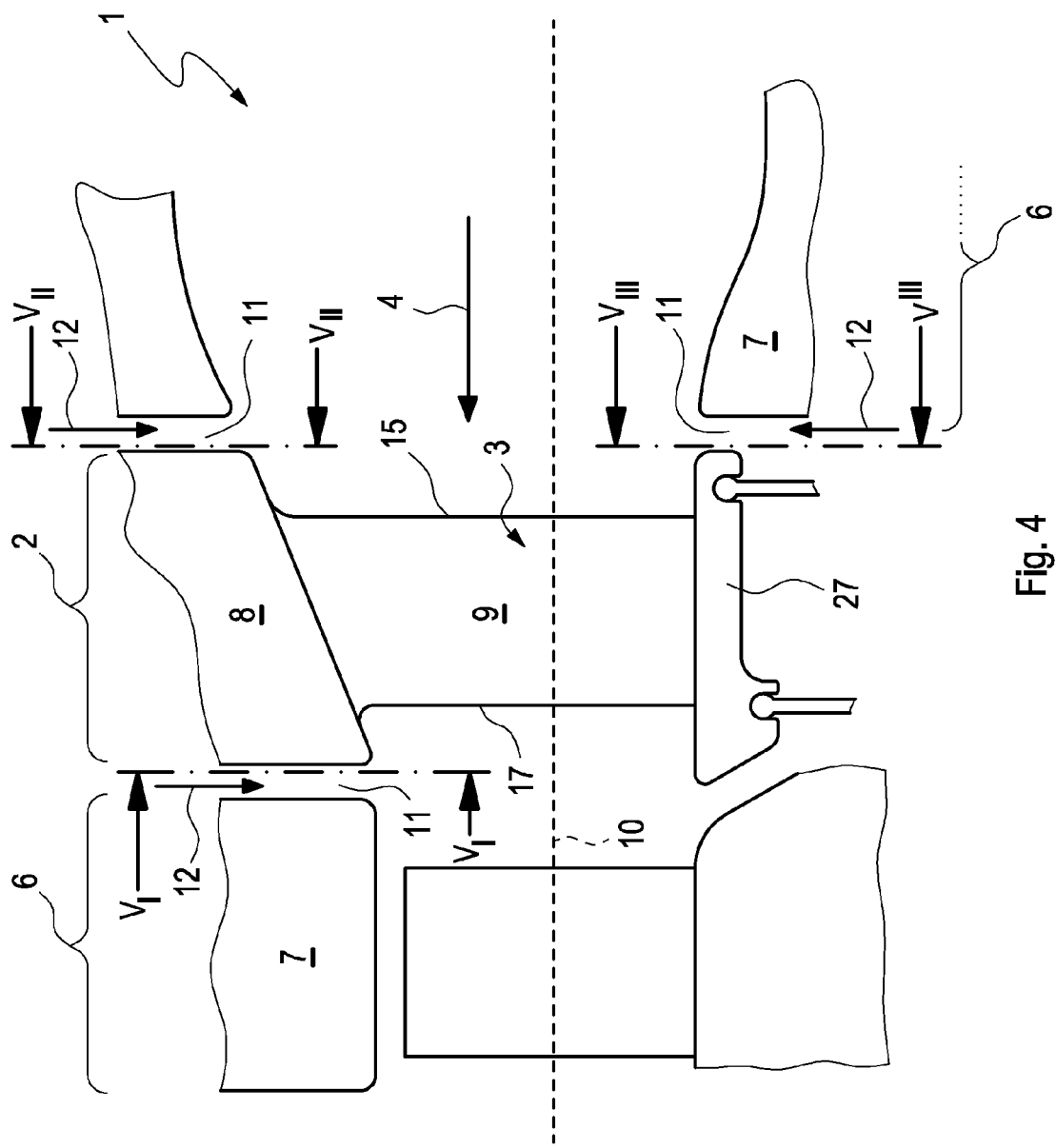
FIG. 4 shows a highly simplified, outline longitudinal section through a continuous-flow machine in the area of a stator blade.

As shown in FIGS. 1 and 4, a continuous-flow machine 1 includes at least one stator blade section 2, which is, in this case, identified by a bracketed section. This stator blade section 2 has a plurality of stator blades 3 which are arranged alongside one another in a lateral direction 5 which is indicated by a double-headed arrow and runs transversely with respect to a main flow direction 4, indicated by an arrow, of a working gas. Only one single stator blade 3 can be seen completely, in the form of a profile, in the section of the continuous-flow machine 1 illustrated in FIG. 1.

The continuous-flow machine 1 is preferably a rotating continuous-flow machine, for example a turbine or a compressor. It is preferably a turbine, in particular a gas turbine or a steam turbine. The continuous-flow machine 1 then normally has a stator and a rotor which can rotate about its longitudinal center axis therein. The rotation axis in this case defines the axial direction of the continuous-flow machine 1. In this case, the main flow direction 4 runs parallel to the axial direction, while the lateral direction 5 runs in a circumferential direction of the continuous-flow machine 1, with respect to this rotation axis. The viewing direction in FIG. 1 then corresponds, with respect to the rotation axis, to a radial direction of the continuous-flow machine 1. The working gas in the continuous-flow machine 1 is preferably a hot combustion gas, which is expanded in the turbine. If the continuous-flow machine 1 is in the form of a rotating continuous-flow machine, the stator blade section 2 is a row of stator blades in the continuous-flow machine 1.

As shown in FIGS. 1 and 4, the continuous-flow machine 1 in each case has an adjacent section 6, which is adjacent to the illustrated stator blade section 2 and is in each case symbolized by a bracketed section, upstream and downstream in terms of the main flow direction 4. The respective adjacent section 6 has a plurality of adjacent elements 7 which are arranged alongside one another in the lateral direction 5.

Each stator blade 3 includes a foot body 8, like a platform, as well as a profile body 9 which projects from the foot body 8 and can be seen in the profile in the present illustration. The profile body 9 of each stator blade 3 therefore projects into a gas path 10 of the working gas, or through it, as indicated by a dashed line here. In contrast to this, the adjacent elements 7 do not project into the working gas path 10 but form a side boundary for the working gas path 10. By way of example, the adjacent elements 7 may be protective heat-shield elements which can be arranged between two stator blade sections 2, which are adjacent in the main flow direction 4, or which can be arranged in a combustion chamber which may be adjacent to and upstream of the first stator blade section 2. The adjacent elements 7 may likewise be rotor blades. The adjacent elements 7 may be located on the internal diameter or on the external diameter. In principle, the elements which are adjacent here may thus be a stator blade, a heat shield, or a combustion-chamber lining.

A gap 11 is in each case formed in the main flow direction 4 between the foot bodies 8 or stator blades 3 of the respective stator blade section 2 and the adjacent elements 7 of the respective adjacent section 6. Each gap 11 in this case extends in the lateral direction 5. Each gap 11 is connected to a cooling gas supply device 12 which is indicated here by arrows and leads to the respective gap 11 via corresponding channels or lines 13. The respective lines or channels 13 are in this case likewise represented in a simplified form by arrows or lines with arrows. A cooling gas can therefore be introduced into the working gas path 10 via the respective gap 11. In this case, the cooling gas which is introduced into the respective gap 11 is used primarily to prevent ingress of the hot working gas into the gap 11. In addition, those surfaces which are subject to the hot gas in the area of the gap 11 are intended to be cooled by the cooling gas.

According to principles of the invention, lateral seals 14 are formed in the respective gap 11. These are illustrated in a simplified form in FIGS. 1 and 5. These lateral seals 14 are designed such that they prevent, or at least impede or reduce, pressure equalization or any gas flow in the lateral direction 5 in the gap 11. Flows in the lateral direction 5 within the gap 11 can thus be suppressed to a greater or lesser extent with the aid of the lateral seals 14. This makes it possible to limit pressure fluctuations, which may occur locally in the gaps 11, in the lateral direction 5 to specific sections of the gap 11, in order to reduce interactions with other gap sections.

By way of example, during operation of the continuous-flow machine 1 as shown in FIG. 1, a stagnation-point pressure wave 16 can propagate in the opposite direction to the main flow direction 4, starting from a leading edge 15 of the stator blade 3 or the profile body 9. A wake pressure wave 18, which propagates in the main flow direction 4, can likewise be formed, starting from a trailing edge 17 of the stator blade 3 or of the profile body 9. Considerable pressure fluctuations, in particular pressure peaks, can occur within the respective pressure wave 16 or 18. The pressure waves 16, 18 also cover or move over the gaps 11, as a result of which pressure fluctuations can occur locally in the respective gap 11. The lateral seals 14 can now reduce or prevent propagation of these pressure fluctuations within the respective gap 11.

Figure 5:
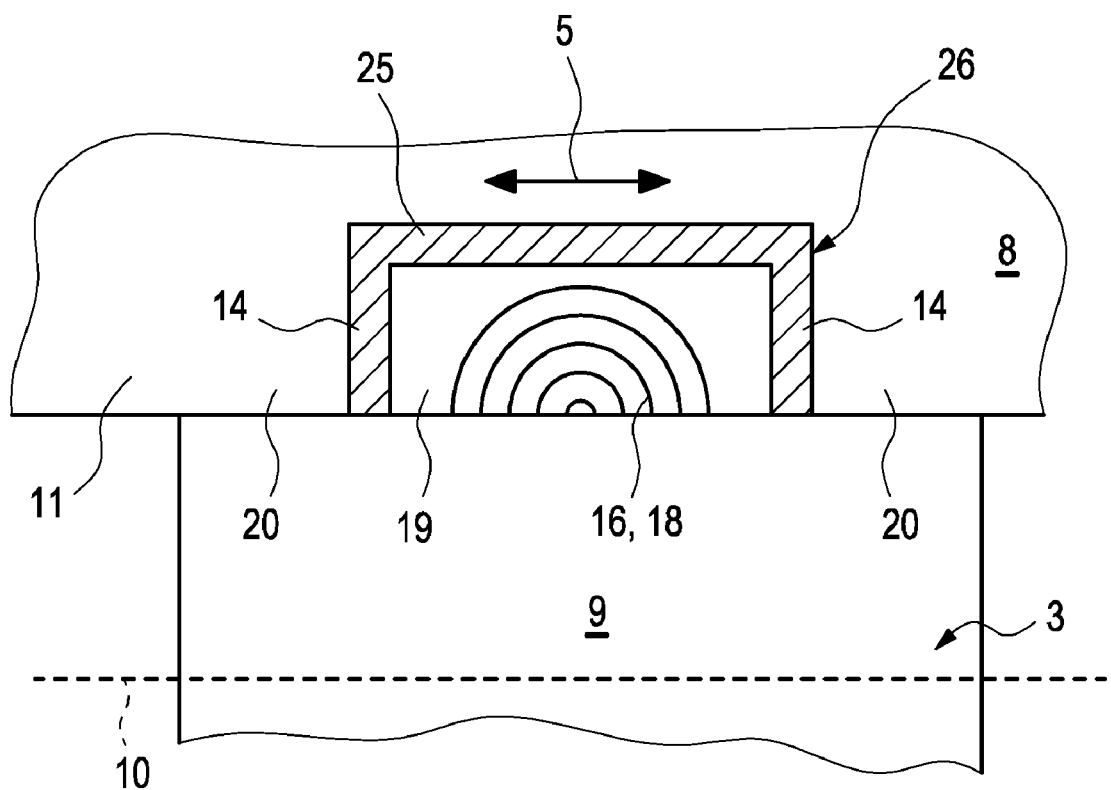
FIG. 5 shows a highly simplified cross section through the continuous-flow machine in the area of a stator blade, corresponding to the section lines V in FIG. 4.

In one advantageous embodiment, the lateral seals 14 are arranged in the area of the stagnation-point pressure wave 16 and/or in the area of the wake pressure wave 18. According to one particular refinement, the lateral seals 14 can be deliberately arranged along the respective gap 11, as shown in FIGS. 1 and 5, such that first gap sections 19 in the respective gap 11 are separated from second gap sections 20 in the lateral direction 5. The first gap sections 19 are in this case positioned such that the stagnation-point pressure wave 16 or wake pressure wave 18 strikes the respective gap 11 in the first gap sections 19. The respective second gap sections 20 are then directly adjacent to the respective first gap sections 19 in the lateral direction 5.

It is now expediently possible to provide for the cooling gas supply 12 to be configured such that the cooling gas is in each case introduced into the gap 11 in the first gap sections 19 at a higher pressure than in the second gap sections 20. By way of example, separate lines or channels 13 may be provided for this purpose which, for example, are restricted to different extents and/or can be controlled differently. It is thus possible to deliberately match the pressure for the cooling gas, that is to say in the end the respectively supplied amount of cooling gas, to the respective local requirement in the respective gap sections 19 and 20. This local cooling gas requirement is greater in the first gap sections 19, because of the pressure fluctuations caused by the pressure waves 16 and 18, than in the adjacent second gap sections 20, in which said pressure fluctuations do not occur. Since, when designing a conventional continuous-flow machine 1, it is assumed that the pressure fluctuations produced by the pressure waves 16 and 20 occur throughout the entire gap 11, and the cooling gas pressure and therefore the amount of cooling gas are dimensioned accordingly, the total amount of cooling gas required for the continuous-flow machine 1 according to principles of the invention can be reduced considerably since it is now necessary only to consider the pressure waves 16, 18 in the first gap sections 19.

Figure 3:
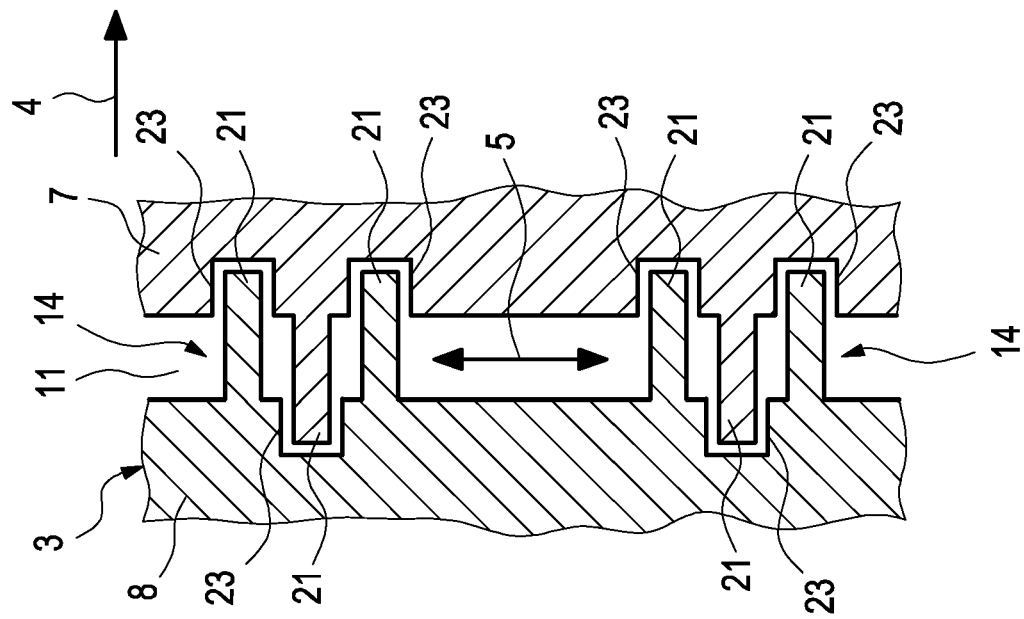
FIG. 3 shows a view as in FIG. 2, but of a different embodiment.
Figure 2:
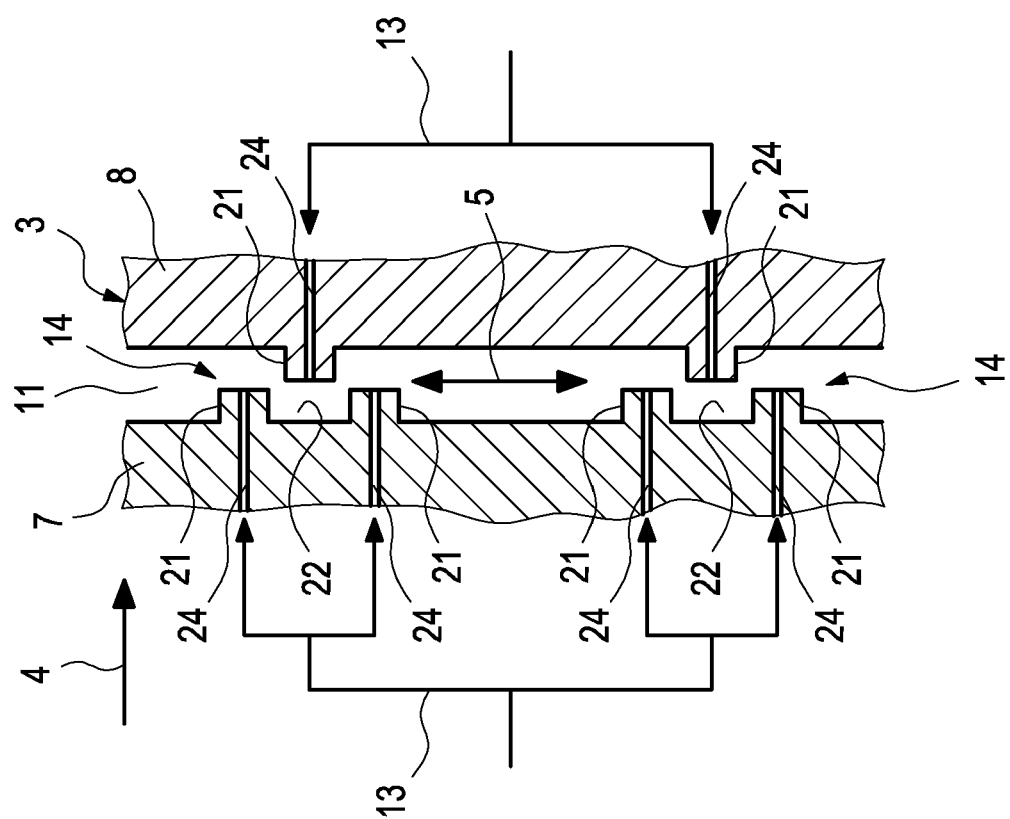
FIG. 2 shows an enlarged section view in the area of a gap.

Corresponding to FIGS. 2 and 3, the lateral seals 14 may have pins or webs 21. These project in the gap 11 from the respective stator blade 3, or from its foot body 8, and from the respective adjacent element 7 in the main flow direction 4. This makes it possible to produce a labyrinthine structure which restricts any gas flow in the gap 11 in the lateral direction 5. In the case of the embodiment shown in FIG. 2, the individual pins or webs 21 extend so far in the main flow direction 4 that the pins or webs 21, which, by way of example, are formed on the stator blade 3, do not enter intermediate spaces 22, which are present in the lateral direction 5 between adjacent pins or webs 21 of the adjacent element 7. In another embodiment, the pins or webs 21 may be dimensioned in the main flow direction 4 such that the pins or webs 21 enter the intermediate spaces 22 in the main flow direction 4, thus making it possible to considerably improve the sealing effect.

As shown in FIG. 3, the lateral seals 14 may also have receptacles or grooves 23 which are positioned and have dimensions such that a pin or web 21 which is arranged opposite can in each case enter or engage in the respective receptacle or groove 23. This once again makes it possible to considerably improve the sealing effect of the labyrinth seal created in this way.

According to one advantageous embodiment as shown in FIG. 2, cooling gas channels 24 can be provided for at least some of the pins or webs 21, through which cooling gas can be introduced into the respective gap 11. At the same time, the exposed pins or webs 21 can be cooled by the selected cooling gas routing.

The pins or webs 21 can be shaped such that they have a longitudinal direction which extends at right angles both to the main flow direction 4 and to the lateral direction 5. This longitudinal direction extends at right angles to the section planes in FIGS. 2 and 3. If the continuous-flow machine 1 has a rotation axis, these longitudinal directions of the pins or webs 21 extend radially with respect to this rotation axis.

The lateral seals 14 can preferably be designed such that this does not adversely affect the fitting of other seals in the respective gap 11. For example, a seal which extends in the lateral direction 5 may be provided in the gap 11, between the respective adjacent element 7 and a support, which is not shown here, for the adjacent element 7. A corresponding seal can also be provided on the foot body 8 of the respective stator blade 3 in order to seal this in the gap 11 with respect to a support to which the respective stator blade 3 is attached.

FIG. 5 shows, in a simplified form, an embodiment in which a seal 25 such as this is provided, and extends in the lateral direction 5. This seal 25 in this case extends between two adjacent lateral seals 14. In the following text, this seal 25 is also referred to as a longitudinal seal, since it extends at right angles to the lateral seals 14. The longitudinal seal 25 in the particular embodiment shown in FIG. 5 is designed and of such a size that it connects the two lateral seals 14 to one another, or is connected to them. The first gap section 19 is therefore bounded in the lateral direction 5 by the two lateral seals 14 and in the radial direction, to be precise on a side facing away from the gas path 10, by the longitudinal seal 25. The seals 14, 25, which interact in this way, form a type of sealing box 26, which encapsulates the first gap section 19 and separates it from the rest of the gap 11. The pressure waves 16 and 18 which enter therein in consequence have no effect or only a greatly reduced effect on the pressures in the rest of the gap 11. As indicated in FIG. 4, a sealing box 26 such as this may be provided radially on the outside on the foot 8 of the stator blade 3 in the downstream gap 11 (section $V_I$-$V_I$) and/or radially on the outside on the foot 8 in the gap 11 upstream of the stator blade 3 (section $V_{II}$-$V_{II}$) and/or on a head 27 of the stator blade 3 in the gap 11, upstream of the stator blade 3 (section $V_{III}$-$V_{III}$).

According to one particularly advantageous embodiment, the dimensions of each stator blade 3 and each adjacent element 7 may be matched to one another such that the respective gap 11 is opened when the continuous-flow machine 1 has cooled down, while it closes to an increasing extent as the temperature rises, in such a way that it is closed when the continuous-flow machine 1 reaches its operating temperature.

It is expediently also possible for the number of stator blades 3 which are adjacent in the circumferential direction and the number of adjacent elements 7 which are adjacent in the circumferential direction to be matched to one another such that they are equal or form an integer multiple. For example, the same number or twice as many stator blades 3 are provided as adjacent elements 7.

Furthermore, the respective gap 11 can be positioned in the main flow direction 4 such that the cooling gas emerges from the gap 11, and enters the working gas path 10, with a velocity component running parallel to the main flow direction 4.

LIST OF REFERENCE SYMBOLS

1 Continuous-flow machine
2 Stator blade section
3 Stator blade
4 Main flow direction
5 Lateral direction
6 Adjacent section
7 Adjacent element
8 Foot body
9 Profile body
10 Working gas path
11 Gap
12 Cooling gas supply device
13 Line/channel
14 Lateral seal
15 Leading edge
16 Stagnation-point pressure wave
17 Trailing edge
18 Wake pressure wave
19 First gap section
20 Second gap section
21 Pin or web
22 Intermediate space
23 Receptacle or groove
24 Cooling gas channel
25 Seal
26 Sealing box
27 Head While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:
1. A continuous-flow machine comprising:
at least one stator blade section having a plurality of stator blades arranged alongside one another in a lateral direction running transversely with respect to a main flow direction of a working gas and projecting into a gas path of the working gas;

at least one adjacent section adjacent to the at least one stator blade section in the main flow direction and having a plurality of adjacent elements arranged alongside one another in the lateral direction and which bound the working gas path at a side;

a gap formed between stator blades of the at least one stator blade section and adjacent elements of the at least one adjacent section, the gap extending in the lateral direction and through which a cooling gas can be introduced into the working gas path; and lateral seals in the gap configured and arranged to at least impede pressure equalization, gas flow, or both, laterally in the gap.

2. The continuous-flow machine as claimed in claim 1, wherein the at least one stator blade section comprises a stator blade row.

3. The continuous-flow machine as claimed in claim 1, wherein the lateral seals are arranged in an area of a stagnation-point pressure wave of a respective stator blade or in an area of a wake pressure wave of a respective stator blade.

4. The continuous-flow machine as claimed in claim 1, wherein the lateral seals are arranged along the gap to define first and second gap sections, the first gap sections positioned where a stagnation-point pressure wave of a respective stator blade or a wake pressure wave of a respective stator blade strikes the gap, the first gap sections being separated from and adjacent to the second gap sections.

5. The continuous-flow machine as claimed in claim 4, further comprising:

cooling gas introduced into the gap with a higher pressure in the first gap sections than in the second gap sections.

6. The continuous-flow machine as claimed in claim 1, wherein the lateral seals comprise pins or webs which project in the main flow direction from a respective stator blade, from a respective adjacent element, or from both, in the gap.

7. The continuous-flow machine as claimed in claim 6, wherein the pins or webs define a longitudinal direction which extends transversely with respect to the main flow direction and transversely with respect to the lateral direction.

8. The continuous-flow machine as claimed in claim 6, wherein the lateral seals comprise receptacles or grooves formed in a respective stator blade, in a respective adjacent element, or in both, opposite the pins or webs in the main flow direction in the gap.

9. The continuous-flow machine as claimed in claim 8, wherein the pins or webs engage in the receptacles or grooves in the main flow direction.

10. The continuous-flow machine as claimed in claim 6, wherein at least some of the pins or webs each have at least one cooling gas channel configured and arranged to permit cooling gas to be introduced into the gap.

11. The continuous-flow machine as claimed in claim 6, wherein the continuous-flow machine comprises a rotating continuous-flow machine having a stator and a rotor, the rotor configured and arranged to rotate about a longitudinal centre axis, wherein a main flow direction runs axially and the lateral direction runs in the circumferential direction, and wherein a longitudinal direction of said pins or webs runs radially.

12. The continuous-flow machine as claimed in claim 1, wherein dimensions of the stator blades and of the adjacent elements are matched to one another such that a respective gap is open when the continuous-flow machine has cooled down, and is closed when the continuous-flow machine is at an operating temperature.

13. The continuous-flow machine as claimed in claim 1, further comprising at least one of:

a support, and a seal extending in the lateral direction in the gap between the respective adjacent element and said support, the adjacent element attached to the support; and a support, and a seal extending in the lateral direction in the gap between respective stator blades and said support, the stator blades attached to the support.

14. The continuous-flow machine as claimed in claim 1, wherein the gap is positioned in the main flow direction such that cooling gas emerges from the gap and enters the gas path with a velocity component running parallel to the main flow direction.

* * * * *